Aug. 10, 1937.    J. F. KOHLER    2,089,803
MACHINE FOR CUTTING DISKS OF THIN SHEET MATERIAL
Filed Sept. 9, 1935    2 Sheets-Sheet 1
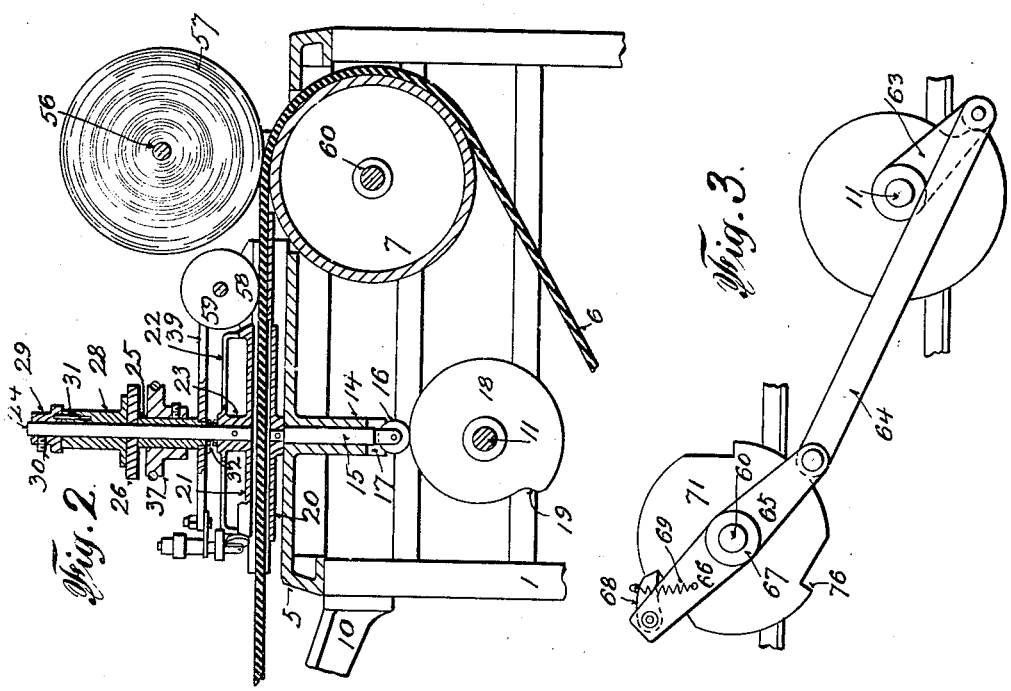
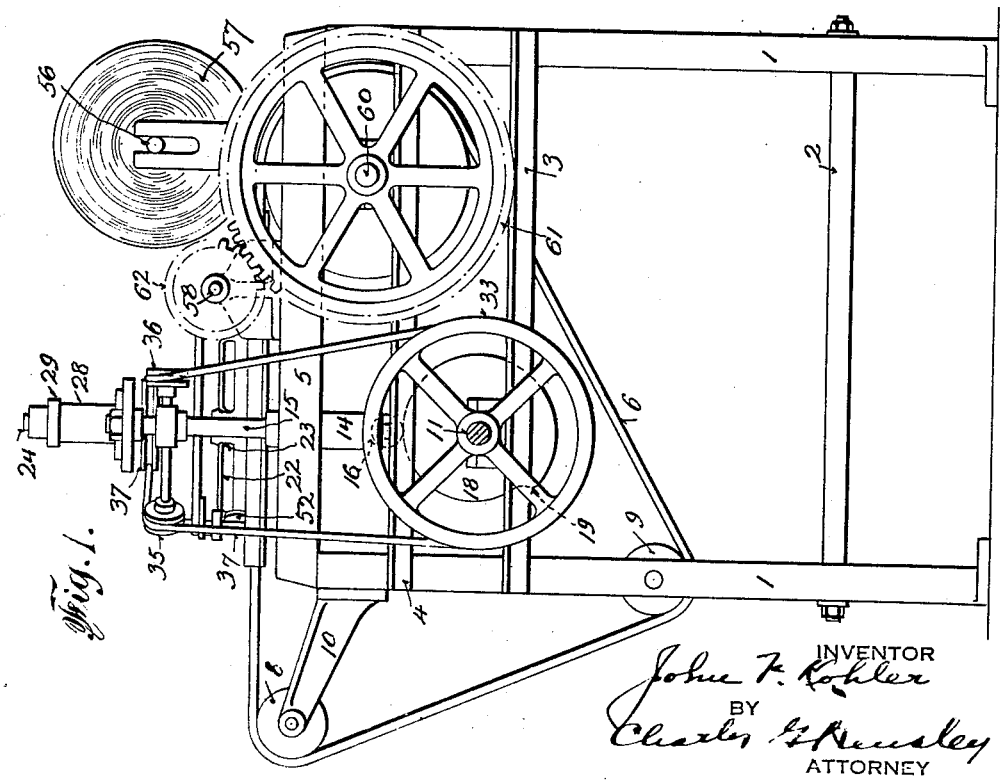
INVENTOR
John F. Kohler
BY
Charles G. Hensley
ATTORNEY Aug. 10, 1937.  J. F. KOHLER  2,089,803
MACHINE FOR CUTTING DISKS OF THIN SHEET MATERIAL
Filed Sept. 9, 1935  2 Sheets-Sheet 2
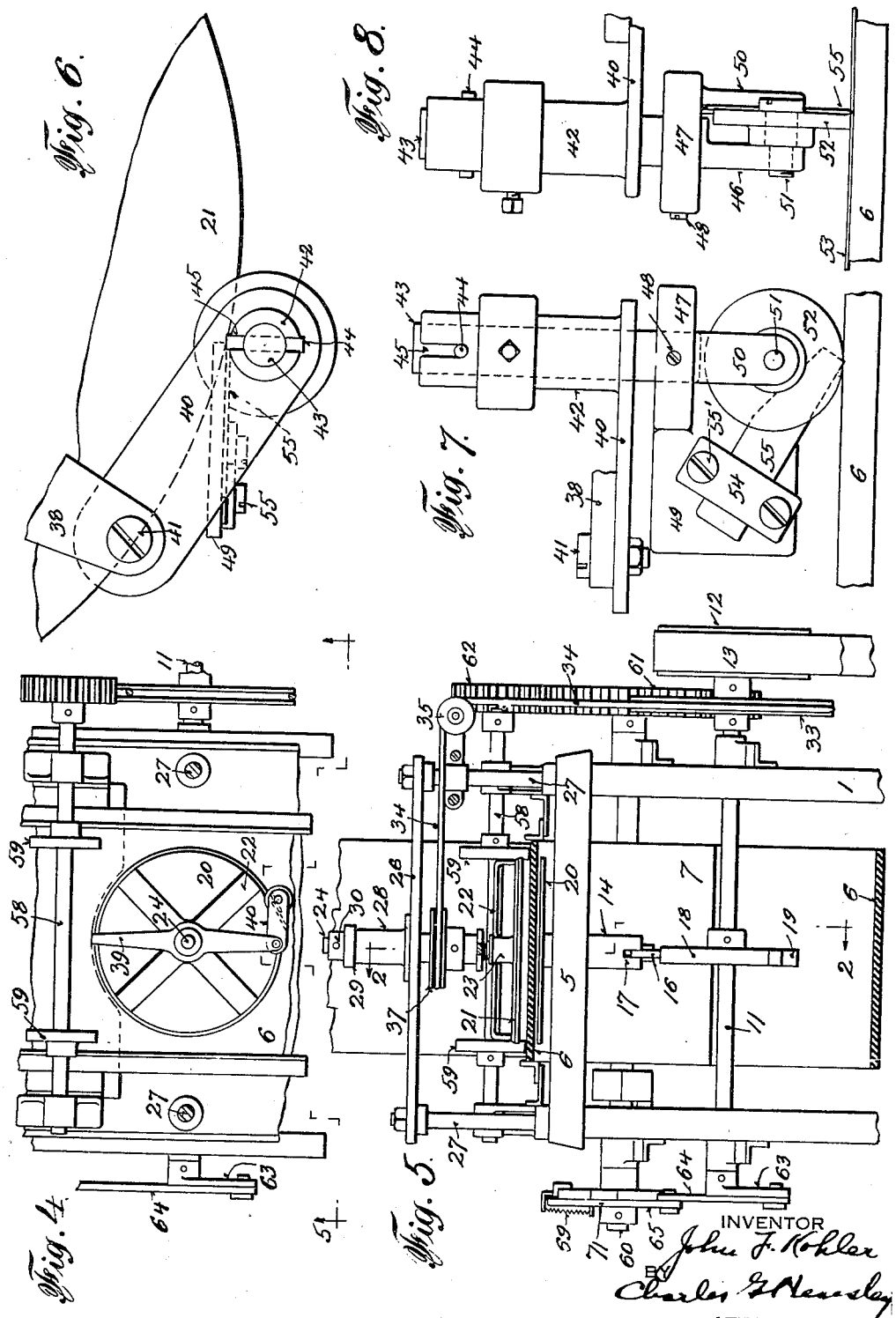
INVENTOR
John F. Kohler
BY
Charles G. Newsley
ATTORNEY Patented Aug. 10, 1937

2,089,803

UNITED STATES PATENT OFFICE 2,089,803

MACHINE FOR CUTTING DISKS OF THIN SHEET MATERIAL

John F. Kohler, New York, N. Y.

Application September 9, 1935, Serial No. 39,800

11 Claims. (Cl. 164—71)

Where it is desired to form circular disks of thin, transparent material, such as the well known trade-mark product known as "Cellophane", and similar products, and also thin sheets of paraffin paper, it has been customary to cut rectangular sections from a continuous strip of material and stack a large number of these sections in a pile, and then trim the pile either with a straight knife machine, or with a circular die, into circular disks, the knife or die in one operation cutting through hundreds of sheets in the stack.

This operation of cutting does not give a clean edge to the disks but presses the edges of many sheets more or less together, making the edges somewhat ragged. Furthermore, sheets cut by either of these methods have a tendency to stick to each other around the edges so that it is necessary to handle the sheets after the cutting operation to separate the sheets from each other. This is a tedious operation in view of the fact that the sheets are extremely thin, running in many cases a few ten-thousandths of an inch thick.

The object of my invention is to provide a device for cutting disks of the material described preferably from a continuous strip or ribbon, preferably cutting each disk individually by means of a revolving cutter, so that there will be no tendency of one disk to adhere to another by reason of locking edges. The present machine produces perfectly smooth edges on the disk so that the disk is much neater in appearance than one cut by either the knife or die referred to above.

I have found that by using a cutting knife which presses lightly against the material which is to be cut and that when the backing under the material is of the right consistency, the knife will very rapidly cut the material, leaving a smooth edge, and that the knife under proper conditions will not cut the backing material even though the latter is made of rubber. The rubber backing, therefore, may be used indefinitely without being cut by the knife, and yet the rubber backing is necessary for the knife to make a clean cut through the material. Where the backing material is of the character described in this application, the knife may be sharp, but even after the edge is somewhat dull it will nevertheless make a clean cut through the material.

The machine shown herein is adapted to cut disks from a continuous or long strip successively and one at a time, although it will be understood that a plurality of cutting members may be arranged to cut disks simultaneously from a wide strip of material in slightly staggered relation to permit a maximum member of disks to be cut from any given strip of material. This means that the parts shown in the present machine may be duplicated where a multiple of disks is to be cut at one time.

The machine involves a backing member, preferably in the form of a belt made of sponge rubber, and a revolving cutting member operates over the belt and against its surface to cut the disk of material while revolving around a presser head which holds the material flat within the circle described by the cutting member; and in addition there is a presser acting under the belt and in co-operation with the upper presser to hold the belt pressed against the material while the cutting operation is taking place.

These pressing members are operated intermittently and the rubber belt referred to is driven intermittently so that the travel of material is arrested while the disk is being cut, although it will be possible to have the cutting mechanism reciprocate to travel with the belt while the cutting operation is taking place. However, the device shown herein is simple in construction and operation and I prefer to use it as shown. Other features and advantages will be set forth in the following detailed description of my invention.

In the drawings forming part of this application,

Figure 1 is a side elevation of a machine embodying my invention,

Figure 2 is a sectional view taken on the line 2—2 of Figure 5,

Figure 3 is a detailed elevation of the means for intermittently driving the belt against which the cutting operation is performed, Figure 4 is a plan view of a portion of the machine, Figure 5 is a sectional view taken on the line 5—5 of Figure 4, Figure 6 is an enlarged plan view of a portion of the upper pressing member and the knife and its carrier, Figure 7 is an elevation of the same parts, and Figure 8 is a view similar to Figure 7 but taken at a different angle.

I have shown the working parts of the machine mounted upon a simple frame consisting of legs 1 united together by tie rods 2 and also by angle rails 3, 4 which form supports for various parts of the mechanism. The frame is also shown as provided with a table 5 which rests upon and is attached to the legs of the frame and which table supports other working parts of the machine.

The belt 6 which forms the opposing member against which the cutting action takes place is shown as endless and as passing around a relatively large roller or drum 7 disposed adjacent one end of the machine, and it also travels over an idler roller 8 disposed adjacent the opposite end of the machine and mounted in suitable brackets 10. The belt also travels around an idler roller 9 journaled in the legs of the frame of the machine, and from there the belt extends back to the large roller or drum 7.

There is a main shaft 11 mounted in journal boxes supported on two of the angle bars 4 and extending crosswise of the machine. There is a pulley 12 mounted on one end of this shaft which is driven by a belt 13 from any source of power. All of the operating parts of the machine are driven from this main shaft.

The top plate or table 5 of the frame is shown provided with a downwardly extending boss 14 through which extends a vertical spindle 15 which is movable vertically in the boss. The lower end of this spindle is provided with an antifriction roller 16 the upper portion of which revolves freely in the slot 17 in the lower end of the boss to keep the roller in alignment. The roller rides upon the surface of a cam 18 which is fixed to and revolves with the main shaft 11. This cam has a single rise 19 which acts on the roller 16 to lift the spindle 15 at each revolution of the main shaft. The spindle 15 carries a pressing member 20 in the form of a disk disposed across the table 5 of the machine with the top surface of the disk lying just under the top horizontal run of the rubber belt.

There is a top pressure plate 21 which is preferably circular and nearly the same diameter as the under pressure plate 20 and the second pressure plate is adapted to engage the top surface of the rubber belt and also the strip of material lying against the top surface of the belt.

This top pressure plate is shown as provided with an integral spider having arms 22 radiating from a central hub 23 with which the pressure plate 21 is also integral. This top pressure plate is fixed on the lower end of the spindle 24 which extends upwardly through a sleeve 25, thence through a bracket 26 which is supported upon the posts 27 from the frame of the machine; and thence the spindle passes through a sleeve or bushing 28 which rests upon the bracket 26, and the upper end of the spindle has secured to it a collar 29 by means of a set screw 30 so that the collar rests on the sleeve 28 and thus supports the spindle as well as the pressure plate 21. There is a pin 31 disposed in an aperture in the sleeve 28 and projecting into an aperture in the collar 29 to prevent the spindle from revolving.

There is a coiled spring 32 surrounding the spindle 24 and compressed between the upper end of the hub 23 and the lower end of the sleeve 25 which spring has a tendency to move the spindle and the pressure plate 21 downwardly to the position shown in Figure 2, and to resiliently resist upward movement of the spindle and the pressure plate. When the pressure plate 21 is in its lowermost position it is clear of the upper run of the belt 6.

The sleeve 25, which carries the cutting device, is revolved in the following manner: On the main shaft 11 there is a pulley 33 partly around which travels an endless belt 34. This belt extends upwardly and travels around the two idlers 35, 36 and from these idlers the belt loops around and engages in the groove of the pulley 37 which is horizontally disposed and is mounted on and fixed to the sleeve 25. By the means just described, the sleeve 25 is revolved continuously while the machine is in operation.

The cutting device is constructed as follows: There is an arm 38 extending radially from and is mounted upon the sleeve 25, which arm projects horizontally over the spider 22 which is part of the top pressure plate. I have shown another arm 39 extending in an opposite direction from the arm 38 which merely acts as a balancing medium to balance the weight of the arm 38. On the outer end of the arm 38 there is connected a link 40 by means of the bolt 41 which permits adjustment of the link but which holds the same in fixed relation to the arm 38 while the machine is in operation. In the outer or free end of the link 40 there is a vertically extending boss 42 through which vertically extends the shaft 43.

There is a pin 44 extending through and projecting from the upper end of the shaft 43 and the ends of this pin project through the vertical slots 45 extending downwardly from the top end of the boss 42 so that the shaft 43 may rise and fall, but is prevented from turning by the pin 44. The lower end of this shaft carries one arm 46 of a fork. There is a casting including a round member 47 which is fitted over the shaft 43 and is secured thereto by a set screw 48. This casting also includes a plate 49 on which the knife is adjustably mounted. The casting includes the second member 50 of the fork, and an axle 51 extends through the lower end of the fork and the plate 49 and on this axle there is revolvably mounted a roller 52 the periphery of which is adapted to engage the top surface of the sheet 53 which is to be cut.

On one side of the plate 49 there is attached a clamp 54 by means of the screws 55' which pass through the clamp and are threaded into the plate 49. The cutting knife 55 is attached to the plate 49 by the clamp 54 in such position that the cutting point of this blade engages in the stock at a point coinciding with the bight of the pressure roller 52 and the stock.

The knife may be adjusted in position and preferably where very thin stock is to be cut the point of the knife will extend only a few thousandths of an inch below the periphery of the roller 52. The casting together with the knife and roller and the vertical shaft are all adapted to rise and fall a limited extent in order that the roller 52 will float or ride upon the top surface of the stock and follow the surface of the stock and limiting the downward movement of the knife, so that the point of the knife can pass through the stock but not cut into the rubber belt 6.

There is an arbor 56 on which a large quantity of the strip material is wound in a body 57 and from this roll the strip of material feeds between the bight of the roller and the top surface of the rubber belt 6 just over the drum 7. In advance of the roll of material and above the belt 6 there is arranged a horizontal shaft 58 on which there are mounted two, preferably rubber covered, disks 59 which contact with the top surface of the strip of stock adjacent the side edges; and the shaft 58 is revolved in the manner hereinafter described in order that the disks 59 may assist the rubber belt 6 in propelling the strip of material with sufficient traction to draw the strip of material from the reel.

The shaft 58 is operated intermittently in time with the shaft 60 of the drum 7 in the following manner; that is to say, there is a large gear 61 fixed on the end of the shaft 60 which is the shaft of the drum, and this gear meshes with and drives the smaller gear 62 which is fixed on the end of the shaft 58 so that through the gears the force for driving the shaft 58 is taken from the shaft 60 and the parts are so designed that the surface speed of the disks 59 will correspond with the surface speed of the rubber belt 6.

The rubber belt is operated intermittently in the following manner:

As shown in Figure 3 the main shaft is provided with a crank arm 63 on the left hand end, as shown in Figure 5. The free end of this crank arm is pivotally connected to a link 64 and the other end of the link is pivotally connected with a lever arm 65. The hub of this lever arm is loosely pivoted on the shaft 60 which is the shaft that carries the drum 7.

There is another lever arm 66 extending from the hub 67 and the outer or free end of this lever arm has pivoted thereon a pawl 68 the free end of which is normally drawn downwardly by a coiled spring 69 having one end attached to the lever arm 66 and the other end attached to the free end of the pawl. This pawl is adapted to engage the notches 70, there being three such notches shown on the periphery of the disk 71 which is fixed on the shaft 60.

Operation

When the main shaft is set into operation, the pulley 33 acting through the endless belt 34 causes the sleeve 25 to be revolved and as the arm 38 which carries the cutting device is fixed to this sleeve the cutting device is caused to revolve around the axis of the spindle 24. The link 40 will be adjusted so that the roller 52 will describe a circle close to the outer edge of the pressure plate 21. The pressure roller rests by gravity on the top surface of the stock and limits the downward motion of the knife.

It will be understood that the casting 49 travels with the link 40 but it is adapted to rise and fall in relation thereto under the action of gravity, so that the roller 52 rides upon the top surface of the stock with a light pressure and it floats so that it conforms with the plane of the stock.

The revolving motion of the main shaft causes the cam 18 to periodically operate on the roller 16 to lift the spindle 15 and the lower pressure plate 20 once for each revolution of the main shaft. This action takes place while the rubber belt 6 is lying idle.

The upward movement of the spindle 15 carries with it the lower pressure plate 20 and this presses upwardly on a portion of the rubber belt and presses the latter against the upper pressure plate 21 causing the latter to rise slightly against the resistance of the spring 32. This will cause the portion of the rubber belt engaged by the pressure plates to be held snugly against them and it also causes the intervening portion of the strip of stock to be held. While the belt and stock are held by the upper and lower pressure plates, the cutting device carried upon the sleeve 25 makes at least one revolution.

The roller 52 rests on the stock and the adjacent portion of the rubber belt, being held there by gravity and the point of the knife projecting slightly below the periphery of the roller 52 cuts through the stock while acting against the top surface of the rubber belt. When the cutting device has made one complete revolution, the lower pressure plate will move downwardly as the roller 16 moves from the higher portion to the lower portion of the cam 18 and this will release the rubber belt from the pressure plates.

At each revolution of the main shaft the crank arm 63 acting through the pitman 64 rocks the arm 65 and as the arm 66 moves with it the pawl 68 engaging one of the notches 70 of the disk 71 causes the shaft 60 to be revolved a portion of a revolution. As the drum 7 is on this shaft this causes the rubber belt to be advanced and as the reel of material is resting on the belt this reel is also turned to pay off an additional supply of material to be fed with the rubber belt into the space between the upper and lower pressure plates.

The feed disks 59 which press against the sides of the stock and against the rubber belt are driven at the same time the drum 7 is driven and they co-operate with the belt to draw the material from the reel and to feed it between the pressure plates.

The disk which is cut from the strip of material after each cutting operation travels out with the rubber belt and it may be discharged adjacent the idler 8 into any suitable receptacle.

The above described operations are repeated so that disks of the material are cut one after another from the strip fed from the reel and if the strip is slightly wider than the diameter of the disks there will be very little waste of material. The disk is cut with a smooth, clear edge and if a number of the disks are stacked one upon another the edges will not adhere together as they do with a large number of blanks cut simultaneously from a number of stacked sheets.

I have found that the most important part of the machine is the material used for the backing in the cutting operation, and in the machine shown constructed herein the rubber belt 6 forms the backing material and the character of this material is a very important, in fact, vital factor in cutting disks of very fine materials like "Cellophane". For this backing material I use sponge rubber on which the skin usually formed when the sponge rubber is moulded, is left on the sheet of rubber to form a smooth surface for the knife to cut against. However, the body of the belt 6 which is the backing member is of the usual construction of sponge rubber. The consistency or compressibility of this sponge rubber should be such as to permit the knife to pass through the stock which is being cut but of such softness as to avoid having the knife cut into the surface of the rubber.

It is obvious that if a circularly moving knife used for cutting the stock, penetrates the surface of the rubber belt or backing member even to a slight extent, the belt will soon become so marred by the cuts that the material can not be cut clean by the knife thereafter.

However, I have found that by selecting sponge rubber having the characteristics mentioned herein that the knife can cut through the stock thousands of times without the slightest injury to the surface of the rubber. If an unyielding material is used as a backing for the stock while it is being cut a clean cut cannot be made. It is this factor which makes it possible to cut the disks clean, to completely sever them from the strip, to avoid injury to the backing member, and to cut disks having clean edges with no burrs or roughness.

The portion of the belt 6 between the pressure plates is slightly raised as described above by the upward movement of the under pressure plate 20. This moves the belt and the stock slightly to bring the material within the reach of the knife which in its lowermost position would not touch the material when the belt is in the lower position shown in Figure 2. The knife, therefore, does not interfere with the advance of the belt 6 while a new portion of the strip of material is being brought into the cutting position.

While I have described my invention as employed for cutting circular disks, nevertheless the sponge rubber backing material may be used in conjunction with a cutting knife for making straight cuts in the material or cuts of any other form and I therefore desire to cover broadly the use of the sponge rubber backing material and the cutting knife both for cutting circular disks or for cutting blanks of other shape.

Having described my invention, what I claim is:

1. A machine for cutting blanks of thin material, said machine having a backing member in the form of a movable endless belt having a horizontal run, a pressing member disposed over and normally out of contact with said belt, a pressing member disposed under said belt and adapted to lift a portion of said belt into contact with said upper pressing member, a cutting member arranged to act on the material on the upper surface of said belt when a portion of the belt is pressed against said upper pressing member and adapted to sever a piece of the material, means for intermittently advancing said endless belt, and means for intermittently raising and lowering said lower pressing member during the stationary periods of said belt.

2. A machine for cutting blanks of thin material, said machine having a backing member in the form of a movable endless belt having a horizontal run, a pressing member disposed over it and normally out of contact with the horizontal run of said belt, spring means for moving said pressing member towards said belt, a pressing member disposed under said belt and adapted to lift a portion of said belt into contact with said upper pressing member and to press the latter upwardly against the opposition of its spring, a cutting member arranged to act on the material on the upper surface of the horizontal run of said belt when a portion of the belt is pressed against said upper pressing member and adapted to sever a piece of the material, means for intermittently advancing said belt, and means for intermittently raising said lower pressing member during the stationary periods of said belt.

3. A machine for cutting blanks of thin material, said machine having a backing member in the form of a movable endless belt having a horizontal run, and means over which said belt travels, including a drum, means for supporting a reel of material over said drum and resting on said belt, disk members co-operating with said belt and acting on the side portions of the strip of material to propel the material drawn from said reel, means for advancing said belt and for rotating said disks intermittently, an upper pressing plate under which a strip of material is carried by said belt, a lower pressing plate co-operating to press a portion of the longitudinal run of said belt and the material lying thereon upwardly against said upper pressing plate, means for intermittently lifting said lower pressing plate while the belt is stationary and a knife acting on the material and against said belt while the latter is stationary and while it is pressed against said upper plate, for the purpose of severing a blank from said strip of material.

4. A machine for cutting blanks of thin material, said machine having a backing member in the form of an endless belt, a pressing member disposed over and normally out of contact with said belt, a pressing member disposed under said belt and adapted to press a portion of the belt into contact with said upper pressing member, a revolvable knife carrier having a knife disposed to cut the material adjacent the periphery of said upper pressing member, means for intermittently advancing said belt means for intermittently operating said lower pressing member, and means for revolving the knife carrier.

5. A machine for cutting blanks of thin material, said machine having a backing member composed of sponge rubber on which the material to be cut is adapted to lie, a pressing member for pressing the material into contact with said backing member, a roller arranged to ride on the surface of the material to press the same against said backing member, and a knife arranged to cut the material against said backing member and acting adjacent the bight of said roller and said backing member.

6. A machine for cutting blanks of thin material, said machine having a backing member in the form of an endless belt made of sponge rubber and having a longitudinal run on which the material to be cut is adapted to lie, a pressing member for holding the material in contact with said belt, a revolvable carrier, a vertically sliding support mounted on said carrier, a roller mounted on said vertically movable support, said roller arranged to roll upon the material resting on said belt, a knife mounted on said vertically movable support and having its cutting portion arranged to act on the material adjacent the bight of said roller and belt, the roller adapted to limit the depth of cut of the knife, means for revolving said support to cause the knife to cut a disk from the material, and means for intermittently moving said belt to bring different portions of the material into co-operative relation with said knife.

7. A machine for cutting blanks of thin material, said machine having an endless belt made of sponge rubber, revolving members around which said belt travels so that a portion of said belt has a horizontal run, a main shaft, a vertically movable pressure plate disposed under a portion of said belt, a cam on said main shaft adapted to move said pressure plate, vertically, a pressure plate arranged above a portion of said belt and into engagement with which said lower pressure plate moves a portion of said belt, said upper pressure plate being mounted on a spindle, a sleeve revolvable on said spindle and means driven from said main shaft for revolving said sleeve, a laterally extending support carried by said sleeve, means mounted on said support for vertical movement, a roller adapted to ride on the material resting on said rubber belt and carrying a knife adapted to cut the material adjacent said roller, said roller and knife adapted to float by gravity against the material on said belt and a crank motion device operated from said main shaft for operating said belt step by step.

8. A device for cutting blanks of thin material, including a backing member made of sponge rubber, means for holding the material to be cut on said backing member, and a cutting knife operating upon the material to be cut and against said backing member to sever a blank from said material.

9. A machine for cutting blanks of thin material, including a backing member made of sponge rubber, means for holding the material upon said backing member during the cutting operation and a cutting knife acting at a single point at a time and movable in relation to the material, said knife acting upon said material and against said sponge rubber backing while cutting a blank from said material.

10. A machine for cutting blanks of thin material, including a backing member consisting of sponge rubber having a skin surface thereon, means for holding the material to be cut upon and against said backing member, and a moving knife arranged to act upon the material and against the skin surface of said backing member to cut a blank from said material.

11. A machine for cutting blanks of thin material, including a backing member of sponge rubber, means for holding the material to be cut against said backing member, a movable cutting knife arranged to act against the material and against said backing member to sever a blank of the material, and means for limiting the depth of cut of the knife to prevent the same from cutting said backing member.

JOHN F. KOHLER.